(12) United States Patent
O'Dea et al.

(10) Patent No.: US 12,403,905 B1
(45) Date of Patent: Sep. 2, 2025

(54) SYSTEM AND METHOD FOR DOWNHILL HEADWAY CONTROL FOR CRUISE CONTROL

(71) Applicant: GM Global Technology Operations LLC, Detroit, MI (US)

(72) Inventors: Kevin A. O'Dea, Ann Arbor, MI (US); Chase Goodin, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 87 days.

(21) Appl. No.: 18/594,356

(22) Filed: Mar. 4, 2024

(51) Int. Cl.
*B60W 30/16* (2020.01)
*B60W 10/18* (2012.01)
*B60W 50/00* (2006.01)

(52) U.S. Cl.
CPC ............ *B60W 30/16* (2013.01); *B60W 10/18* (2013.01); *B60W 50/00* (2013.01); *B60W 2050/0083* (2013.01); *B60W 2300/14* (2013.01); *B60W 2520/403* (2013.01); *B60W 2552/15* (2020.02); *B60W 2554/802* (2020.02)

(58) Field of Classification Search
CPC ...... B60W 30/16; B60W 10/18; B60W 50/00; B60W 2050/0083; B60W 2300/14; B60W 2520/403; B60W 2552/15; B60W 2554/802
See application file for complete search history.

(56) References Cited

U.S. PATENT DOCUMENTS

| 7,966,118 B2* | 6/2011 | Kade ..................... | B60W 30/16 700/304 |
| 2003/0154016 A1* | 8/2003 | Manaka ................... | B60T 7/22 340/436 |
| 2005/0218718 A1* | 10/2005 | Iwatsuki ............... | B60T 8/1766 303/177 |
| 2007/0005218 A1* | 1/2007 | Ueyama ................ | B60W 30/16 701/96 |
| 2013/0041567 A1* | 2/2013 | Yamashiro ................ | B60T 7/22 701/96 |

(Continued)

FOREIGN PATENT DOCUMENTS

| DE | 102005015819 A1 | 10/2005 |
| DE | 60016500 T2 | 1/2006 |

(Continued)

*Primary Examiner* — Babar Sarwar
(74) *Attorney, Agent, or Firm* — Vivacqua Crane, PLLC

(57) ABSTRACT

A cruise control method includes determining that a host vehicle is traveling downhill and determining an axle torque command to maintain a predetermined headway distance from the host vehicle to a lead vehicle while the host vehicle is traveling downhill. The method further includes determining that a brake of the host vehicle is actuated to provide the axle torque command previously determined and comparing the axle torque command with a brake exit threshold to determine whether the axle torque command is greater than the brake exit threshold. Further, the method includes comparing the headway distance between the host vehicle and the lead vehicle with a headway exit threshold to determine whether the headway distance between the host vehicle and the lead vehicle is greater than the headway exit threshold. Also, the method includes commanding the brake of the host vehicle to disengage to terminate braking.

20 Claims, 2 Drawing Sheets

(56) References Cited

U.S. PATENT DOCUMENTS

2018/0037227 A1* 2/2018 D'sa ................... B60W 30/16
2019/0061527 A1* 2/2019 Hassani ............. B60K 31/0008

FOREIGN PATENT DOCUMENTS

| DE | 102016012414 | A1 | * | 5/2017 | .......... B60W 40/076 |
|----|---|---|---|---|---|
| DE | 112020003601 | T5 | * | 6/2022 | ............ B60W 10/18 |
| EP | 1053903 | A2 | * | 11/2000 | ............ B60W 30/16 |
| EP | 4321401 | A1 | * | 2/2024 | ............ B60W 30/14 |
| KR | 20170030936 | A | * | 3/2017 | ............ B60W 30/16 |
| WO | WO-2014092631 | A1 | * | 6/2014 | ........ B60W 50/0097 |

\* cited by examiner

SYSTEM AND METHOD FOR DOWNHILL HEADWAY CONTROL FOR CRUISE CONTROL

INTRODUCTION

The present disclosure relates to adaptive cruise control. Specifically, the present disclosure describes a system and method for downhill headway control using cruise control.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure. When a host vehicle travels downhill, it is challenging to maintain a headway distance between the host vehicle and a lead vehicle due to the use of two actuators (i.e., the propulsion and braking systems) and the gravitational forces due to the road grade. Because two actuators are at play during the downhill movement of the host vehicle, two actuation control commands are necessary to maintain the headway distance between the host vehicle and the lead vehicle. When maintaining this headway distance, the gravitational forces cause the host vehicle 10 to accelerate toward the lead vehicle. If the road is steep enough and long enough, braking may be necessary to maintain the headway distance between the host vehicle and the lead vehicle. Once the desired headway distance is reached, the braking command is terminated, and the host vehicle will once again accelerate toward the lead vehicle. This braking and propulsion cycle, however, causes, among other things, driver discomfort and oscillatory control of the headway distance. It is therefore desirable to develop a method and system to maintain the headway distance from the host vehicle 10 to the lead vehicle that avoids the oscillatory nature of the braking and propulsion cycles.

SUMMARY

The present disclosure describes a cruise control method. The cruise control method also includes determining that a host vehicle is traveling downhill and determining an axle torque command to maintain a predetermined headway distance from the host vehicle to a lead vehicle while the host vehicle is traveling downhill along a roadway. The lead vehicle is immediately in front of the host vehicle. The axle torque command is a function of a road grade of the roadway. The roadway has a road surface. The road grade is the angle from the road surface to a virtual horizontal line. The method further includes determining that a brake of the host vehicle is actuated to provide the axle torque command previously determined and comparing the axle torque command with a brake exit threshold to determine whether the axle torque command is greater than the brake exit threshold. Further, the method includes, in response to determining that the axle torque command is greater than the brake exit threshold, comparing the headway distance between the host vehicle and the lead vehicle with a headway exit threshold to determine whether the headway distance between the host vehicle and the lead vehicle is greater than the headway exit threshold. Also, the method includes, in response to determining that the predetermined headway distance between the host vehicle and the lead vehicle is greater than the headway exit threshold, commanding the brake of the host vehicle to disengage to terminate braking. Other embodiments of this aspect include corresponding computer systems, apparatus, and computer programs recorded on one or more computer storage devices, each configured to perform the actions of the methods. The method described in this paragraph improves vehicle technology by maintaining a predetermined distance between a host vehicle and a lead vehicle when the host vehicle is traveling downhill and relying on cruise control, thereby minimizing the risk that the host vehicle will contact the lead vehicle when traveling downhill.

In some aspects of the present disclosure, the cruise control method may include determining a maximum axle torque command. The maximum torque command is a function of the road grade. Also, the method includes, in response to determining that the axle torque command is not greater than the brake exit threshold, limiting the axle torque command to the maximum axle torque command. The delta velocity is the difference between the velocity of the lead vehicle and the velocity of the host vehicle. The cruise control method may include comparing the delta velocity with a lead velocity threshold to determine whether the delta velocity is greater than the lead velocity threshold. Further, the cruise control method may include determining that the brake exit threshold is equal to a difference between an initial break exit threshold and a deceleration offset value in response to determining that the delta velocity is greater than the lead velocity threshold. The cruise control method may include determining that the headway exit threshold is equal to a difference between an initial headway exit threshold and a headway offset value in response to determining that the delta velocity is greater than the lead velocity threshold. The cruise control method may include determining that the brake exit threshold is equal to an initial break exit threshold in response to determining that the delta velocity is not greater than the lead velocity threshold. The cruise control method may include determining that the headway exit threshold is equal to an initial headway exit threshold in response to determining that the delta velocity is not greater than the lead velocity threshold. The axle torque command is a function of the predetermined headway distance from the host vehicle to the lead vehicle. The vehicle is attached to a trailer. The axle torque command is determined using a following equation:

$$AxCommand = K1*HD_{err} + K2*\Delta HD_{err} - mg*\sin(\theta)$$

where:
m = a mass of vehicle plus the mass of trailer;
K1 is a first calibration factor;
K2 is a second calibration factor;
g is the gravitational constant;
V is the host vehicle speed;
HT is the driver selected headway time;
HD is the predetermined headway distance (V*HT) from the host vehicle to the lead vehicle;
L is the measured distance from the host vehicle to the lead vehicle;
$HD_{err}$ is the headway error, HD−L;
θ is the angle from the road surface to the virtual horizontal line; and
$\Delta HD_{err}$ is a first derivate of the headway error with respect to time.

The present disclosure also describes a vehicle including sensors, a propulsion system, a braking system, and a controller. The controller is in communication with the sensors, the braking system, and the propulsion system and is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
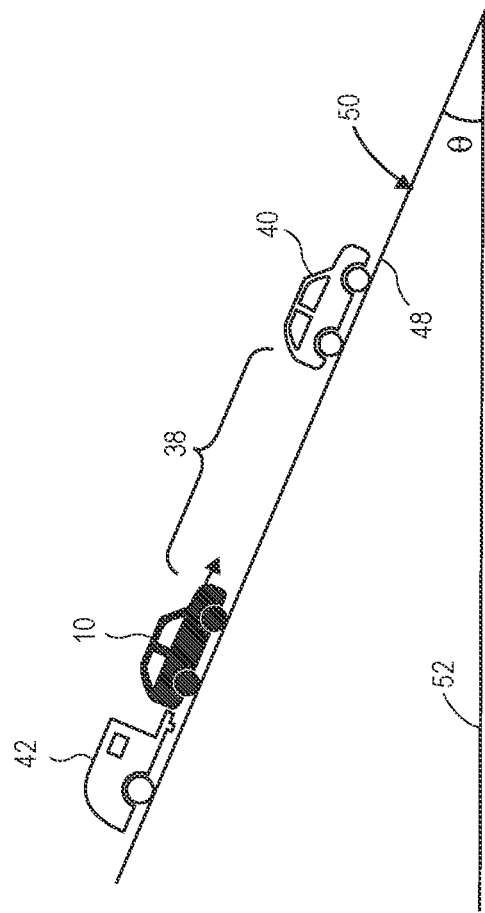
FIG. 1 is a schematic diagram of a host vehicle including a cruise control system.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a body 12 and a plurality of wheels 14 coupled to the body 12. The host vehicle 10 may be an autonomous vehicle. In the depicted embodiment, the host vehicle 10 is depicted in the illustrated embodiment as a sedan, but it should be appreciated that other vehicles including trucks, coupes, sport utility vehicles (SUVs), recreational vehicles (RVs), etc., may also be used.

The host vehicle 10 further includes one or more sensors 24 coupled to the body 12. The sensors 24 sense observable conditions of the exterior environment and/or the interior environment of the host vehicle 10. As non-limiting examples, the sensors 24 may include one or more cameras, one or more light detection and ranging (LIDAR) sensors, one or more radars, one or more Global Positioning System (GPS) transceivers, one or more tilt sensors, one or more inertial measurement units (IMUs), one or more accelerometers, one or more vehicle speed sensors, one or more wheel speed sensors, one or more yaw rate sensors, one or more gyroscopes, one or more proximity sensors, one or more cameras, one or more ultrasonic sensors, one or more thermal imaging sensors, and/or other sensors 24. Each sensor 24 is configured to generate a signal that is indicative of the sensed observable conditions (i.e., sensor data) of the exterior environment and/or the interior environment of the host vehicle 10.

The host vehicle 10 includes a vehicle controller 34 in communication with the sensors 24. The vehicle controller 34 includes at least one vehicle processor 44 and a vehicle non-transitory computer readable storage device or media 46. The vehicle processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the host vehicle 10. The vehicle controller 34 of the host vehicle 10 may be programmed to execute the method 100 (FIG. 3) and the method 200 (FIG. 4) as described in detail below.

The instructions may include one or more separate programs, each of which comprises an ordered listing of executable instructions for implementing logical functions. The instructions, when executed by the vehicle processor 44, receive and process signals from sensors, perform logic, calculations, methods and/or algorithms for automatically controlling the components of the host vehicle 10, and generate control signals to automatically control the components of the host vehicle 10 based on the logic, calculations, methods, and/or algorithms. Although a single vehicle controller 34 is shown in FIG. 1, embodiments of the host vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the host vehicle 10. The vehicle controller 34 is part of a system 21 for downhill headway control using full speed range adaptive cruise control.

The host vehicle 10 includes a propulsion system 26 for propelling the host vehicle 10. The propulsion system 26 is coupled to one or more wheels 14 and may include an internal combustion engine 28 and/or an electric motor 30. The propulsion system 26 is in communication with the vehicle controller 34. Accordingly, the vehicle controller 34 may receive information from the propulsion system 26. Further, the vehicle controller 34 may send commands to the propulsion system 26.

In addition, the host vehicle 10 includes a braking system 32 for decelerating the host vehicle 10. The braking system 32 is coupled to one or more wheels 14 and includes one or more brakes 36. The braking system 32 is in communication with the vehicle controller 34. Accordingly, the vehicle controller 34 may receive information from the braking system 32. Further, the vehicle controller 34 may send commands to the braking system 32.

Figure 2:
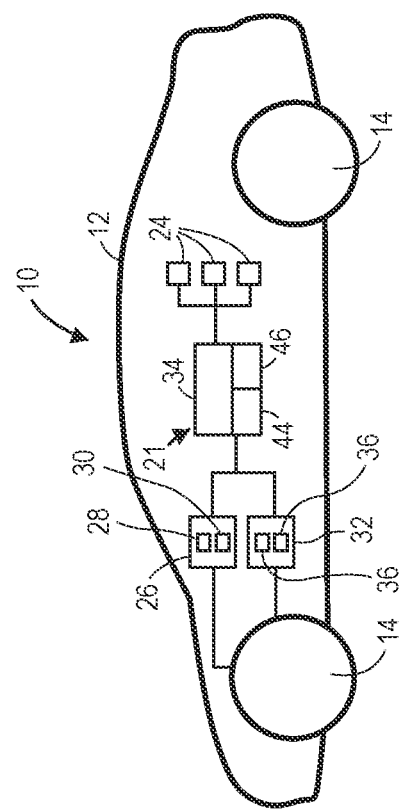
FIG. 2 is a schematic diagram of a host vehicle attached to a trailer, wherein the host vehicle is traveling downhill and is spaced apart from the lead vehicle, and the lead vehicle is also traveling downhill.

With reference to FIG. 2, when the host vehicle 10 travels downhill, it is desirable to maintain a predetermined headway distance 38 (e.g., three meters) from the lead vehicle 40.

The lead vehicle 40 is directly and immediately in front of the host vehicle 10 and, therefore, no other vehicle is located between the host vehicle 10 and the lead vehicle 40. A trailer 42 may be attached to the host vehicle 10 while the host vehicle 10 travels downhill. In this case, the host vehicle 10 travels along a roadway 48 having a road surface 50. The road grade of the roadway 48 is defined as the angle θ from the road surface 58 to a virtual horizontal line 52.

Figure 3:
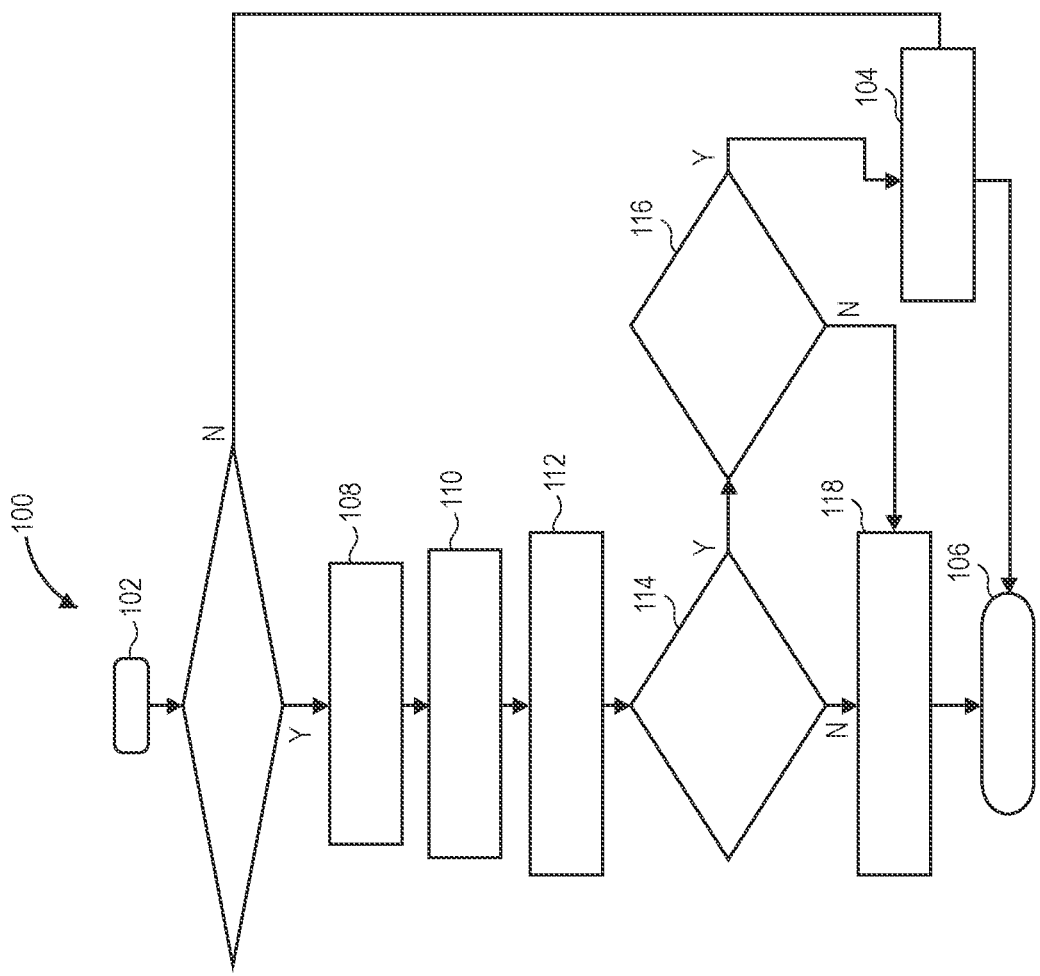
FIG. 3 is a flowchart of a cruise control method for maintaining a headway distance between a host vehicle and a lead vehicle while the host vehicle is traveling downhill.

FIG. 3 is a method 100 for maintaining the predetermined headway distance 38 between the host vehicle 10 and the lead vehicle 40 while the host vehicle 10 is traveling downhill. The method 100 begins at block 102. At block 102, the vehicle controller 34 determines whether the host vehicle 10 is traveling downhill. To do so, the vehicle controller 34 may receive road-grade data from the sensors 24 (e.g., one or more tilt sensors) and/or GPS data from the GPS transceivers. The vehicle controller 34 then uses the road-grade data to determine that the host vehicle 10 is traveling downhill. The road-grade data may include the road grade (i.e., the angle θ from the road surface 58 to a virtual horizontal line 52) of the roadway 48. Also, the vehicle controller 34 determines an axle torque command to maintain the predetermined headway distance 38 from the host vehicle 10 to the lead vehicle 40 while the host vehicle 10 is traveling downhill along the roadway 48. As discussed, the lead vehicle 40 is immediately in front of the host vehicle 10. The axle torque command is a function of a road grade of the roadway 48. As discussed above, the road grade is defined as the angle θ from the road surface 58 to a virtual horizontal line 52. The axle torque command may be a braking command. During a braking command, the vehicle controller 34 commands the braking system 32 to actuate the brakes 36 to decelerate the host vehicle 10. The vehicle controller 34 may use the following equation to determine the axle torque command:

$$AxCommand = K1 * HD_{err} + K2 * \Delta HD_{err} - mg * \sin(\theta)$$

where:
m is the mass of the host vehicle 10 plus the mass of trailer 42;
K1 is a first calibration factor;
K2 is a second calibration factor;
g is the gravitational constant;
V is the host vehicle speed;
HT is the driver selected headway time;
HD is the predetermined headway distance (V*HT) 38 from the host vehicle to the lead vehicle;
L is the measured distance from the host vehicle to the lead vehicle;
$HD_{err}$ is the headway error, HD−L;
θ is the angle from the road surface 50 to the virtual horizontal line 52; and
$\Delta HD_{err}$ is a first derivate of the headway error 38 with respect to time.

The method 100 then proceeds to block 104. At block 104, the vehicle controller 34 determines whether one or more brakes 36 of the braking system 32 of the host vehicle are actuated to provide the axle torque command previously determined to maintain the predetermined headway distance 38 from the host vehicle 10 to the lead vehicle 40.

If one or more brakes 36 are not actuated, then the method 100 proceeds to block 104. At block 104, the vehicle controller 34 sets the braking actuation flag to be false. Then, the method 100 continues to block 106. At block 106, the method 100 restarts. If the one or more brakes 36 are actuated, then the method 100 proceeds to block 108.

At block 108, the vehicle controller 34 determines the maximum axle torque command. The maximum axle torque command is the maximum allowed braking command in terms of acceleration and is a function of the road grade. The maximum axle torque command may be determined by using a look-up table. This look-up table may be developed by testing the host vehicle 10 and has the road grade and the acceleration as the inputs and the maximum axle torque command as the output. Alternatively, the vehicle controller 34 may use the following equation to determine the maximum axle torque command:

$$AxCommandMax = \max(0, g * \sin(\theta))$$

where:
AxCommandMax is the maximum axle torque command;
g is the gravitational constant; and
θ is the angle from the road surface 50 to the virtual horizontal line 52, wherein θ is defined as a positive value when traveling downhill and a negative value when traveling uphill, and g*sin(θ) is a positive value.

Then, the method 100 proceeds to block 110. At block 110, the vehicle controller 34 determines a brake exit threshold, which is described in detail with respect to FIG. 4. Then, the method 100 continues to block 112. At block 112, the vehicle controller 34 determines the headway exit threshold which is described in detail with respect to FIG. 4. Next, the method 100 continues to block 114.

At block 114, the controller 34 compares the axle torque command with the brake exit threshold to determine whether the axle torque command is greater than the brake exit threshold. If the axle torque command is greater than the brake exit threshold, then the method 100 proceeds to block 116. At block 116, the vehicle controller 34 compares the current headway distance from the host vehicle 10 to the lead vehicle 40 with a headway exit threshold to determine whether the current headway distance from the host vehicle 10 to the lead vehicle 40 is greater than the headway exit threshold. If the current headway distance from the host vehicle 10 to the lead vehicle 40 is greater than the headway exit threshold, then the method 100 proceeds to block 104. At block 104, the vehicle controller 34 commands the braking system 32 (and therefore one or more brakes 36) of the host vehicle 10 to disengage to terminate braking. If the current headway distance from the host vehicle 10 to the lead vehicle 40 is not greater than the headway exit threshold, then the method 100 proceeds to block 118. At block 118, the vehicle controller 34 limits the axle torque command to the maximum axle torque command. Therefore, at block 118, braking is not terminated but it is limited to the maximum axle torque command. After block 118, the method 100 continues to block 106.

Figure 4:
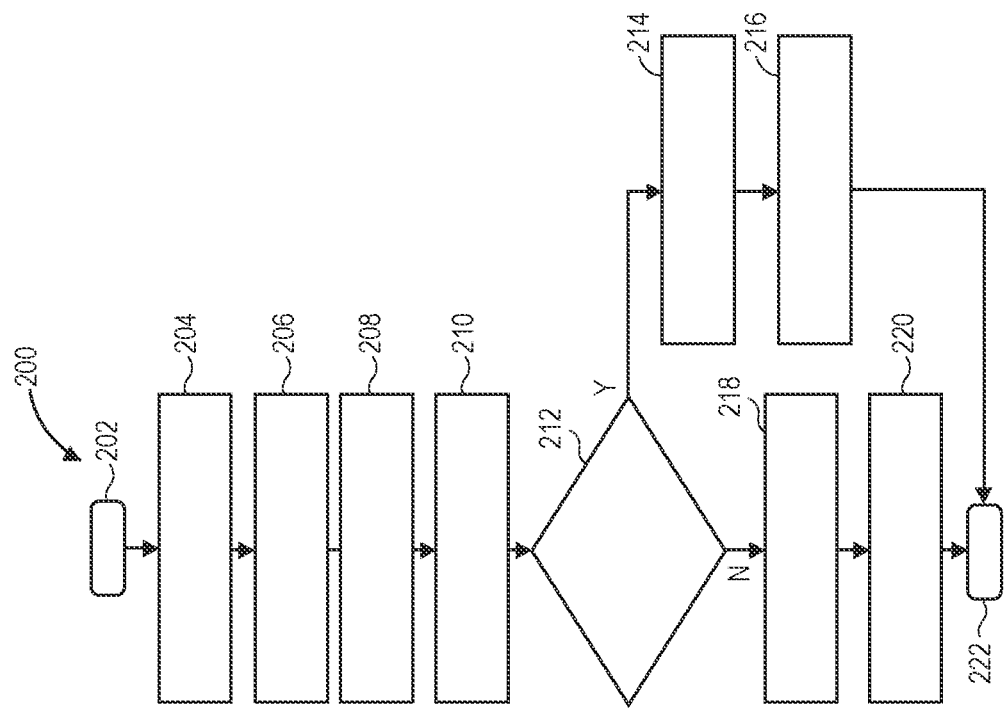
FIG. 4 is a flowchart of a method for determining a brake exit threshold and a headway exit threshold used in the method of FIG. 3.

FIG. 4 is a flowchart of a method 200 for determining a brake exit threshold and a headway exit threshold used in the method 100 of FIG. 3. The method 200 begins at block 202. Then, the method 200 proceeds to block 204. At block 104, the vehicle controller 34 determines an initial break exit threshold. The initial break exit threshold is determined using a look-up table that is developed by testing the host vehicle 10. The input of the look-up table is the road grade of the roadway 48. Therefore, the initial break exit threshold is a function of the road grade. Then, the method 200 continues to block 206.

At block 206, the vehicle controller 34 determines a deceleration offset value. As discussed below, the deceleration offset value is used if the velocity of the lead vehicle 40 is greater than the velocity of the host vehicle and, therefore, the lead vehicle 40 is moving away from the host vehicle 10.

The deceleration offset value is determined using a look-table that is developed by testing the host vehicle 10. The input of this look-up table is the road grade of the roadway 48. Therefore, the deceleration offset value is a function of the road grade. Then, the method 300 continues to block 208.

At block 208, the vehicle controller 34 determines an initial headway exit threshold. The initial headway exit threshold is determined using a look-up table that is developed by testing the host vehicle 10. The input of the look-up table is the road grade of the roadway 48. Therefore, the initial headway exit threshold is a function of the road grade. Then, the method 200 continues to block 210.

At block 210, the vehicle controller 34 determines a headway offset value. The headway offset value is determined using a look-table that is developed by testing the host vehicle 10. The input of this look-up table is the road grade of the roadway 48. Therefore, the headway offset value is a function of the road grade. Then, the method 300 continues to block 212.

At block 212, the vehicle controller 34 determines a delta velocity. The delta velocity is the difference between the velocity of the lead vehicle 40 and the velocity of the host vehicle 10. Then, the vehicle controller 34 compares the delta velocity with a lead velocity threshold to determine whether the delta velocity is greater than the lead velocity threshold. If the delta velocity is greater than the lead velocity threshold, then the method 200 proceeds to block 214. If the delta velocity is not greater than the lead velocity threshold, then the method 200 proceeds to block 218.

At block 214, the vehicle controller 34 sets the brake exit threshold to be equal to a difference between the initial break exit threshold and the deceleration offset value in response to determining that the delta velocity is greater than the lead velocity threshold. Then, the method 200 continues to block 216.

At block 216, the vehicle controller 34 sets the headway exit threshold to be equal to a difference between an initial headway exit threshold and a headway offset value in response to determining that the delta velocity is greater than the lead velocity threshold. Then, the method 200 continues to block 222. At block 222, the method 200 ends.

At block 218, the vehicle controller 34 sets the brake exit threshold to be equal to the initial break exit threshold. Then, the method 200 continues to block 220. At block 220, the vehicle controller 34 sets the initial headway exit threshold to be equal to the initial headway exit threshold. Then, the method 200 continues to block 222. At block 22w, the method 200 ends.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A cruise control method, comprising:
   determining that a host vehicle is traveling downhill;
   determining an axle torque command to maintain a predetermined headway distance from the host vehicle to a lead vehicle while the host vehicle is traveling downhill along a roadway, wherein the lead vehicle is immediately in front of the host vehicle, the axle torque command is a function of a road grade of the roadway, the roadway has a road surface, and the road grade is an angle from the road surface to a virtual horizontal line;
   determining that a brake of the host vehicle is actuated to provide the axle torque command previously determined;
   comparing the axle torque command with a brake exit threshold to determine whether the axle torque command is greater than the brake exit threshold;
   in response to determining that the axle torque command is greater than the brake exit threshold, comparing a current headway distance between the host vehicle and the lead vehicle with a headway exit threshold to determine whether the current headway distance between the host vehicle and the lead vehicle is greater than the headway exit threshold; and
   in response to determining that the predetermined headway distance between the host vehicle and the lead vehicle is greater than the headway exit threshold, commanding the brake of the host vehicle to disengage to terminate braking.

2. The cruise control method of claim 1, further comprising:
   determining a maximum axle torque command, wherein the maximum axle torque command is a function of the road grade; and
   in response to determining that the axle torque command is not greater than the brake exit threshold, limiting the axle torque command to the maximum axle torque command.

3. The cruise control method of claim 2, further comprising:
   determining a velocity of the host vehicle;
   determining a velocity of the lead vehicle; and
   determining a delta velocity, wherein the delta velocity is a difference between the velocity of the lead vehicle and the velocity of the host vehicle.

4. The cruise control method of claim 3, further comprising:
   comparing the delta velocity with a lead velocity threshold to determine whether the delta velocity is greater than the lead velocity threshold.

5. The cruise control method of claim 4, further comprising:
   setting the brake exit threshold to be equal to a difference between an initial break exit threshold and a deceleration offset value in response to determining that the delta velocity is greater than the lead velocity threshold.

6. The cruise control method of claim 5, further comprising:
   setting the headway exit threshold to be equal to a difference between an initial headway exit threshold and a headway offset value in response to determining that the delta velocity is greater than the lead velocity threshold.

7. The cruise control method of claim 4, further comprising:
   determining that the brake exit threshold is equal to an initial break exit threshold in response to determining that the delta velocity is not greater than the lead velocity threshold.

8. The cruise control method of claim 7, further comprising:
   determining that the headway exit threshold is equal to an initial headway exit threshold in response to determining that the delta velocity is not greater than the lead velocity threshold.

9. The cruise control method of claim 1, wherein the axle torque command is a function of the predetermined headway distance from the host vehicle to the lead vehicle.

10. The cruise control method of claim 1, wherein the host vehicle is attached to a trailer, and the axle torque command is determined using a following equation:

$$\text{AxCommand} = K1 * \text{HDerr} + K2 * \Delta \text{HDerr} - mg * \sin(\theta)$$

where:
m = a mass of vehicle plus the mass of trailer;
K1 is a first calibration factor;
K2 is a second calibration factor;
g is a gravitational constant;
V is the host vehicle speed;
HT is the driver selected headway time;
HD is the predetermined headway distance (V*HT) from the host vehicle to the lead vehicle;
L is the measured distance from the host vehicle to the lead vehicle;
$\text{HD}_{err}$ is the headway error, HD−L;
θ is the angle from the road surface to the virtual horizontal line; and
ΔHDerr is a first derivate of the headway error with respect to time.

11. A vehicle, comprising:
   a plurality of sensors;
   a propulsion system;
   a braking system including a brake;
   a controller in communication with the plurality of sensors, the propulsion system, and the braking system, wherein the controller is programmed to:
      determine that a host vehicle is traveling downhill;
      determine an axle torque command to maintain a predetermined headway distance from the host vehicle to a lead vehicle while the host vehicle is traveling downhill along a roadway, wherein the lead vehicle is immediately in front of the host vehicle, the axle torque command is a function of a road grade of the roadway, the roadway has a road surface, and the road grade is an angle from the road surface to a virtual horizontal line;
      determine that the brake of the host vehicle is actuated to provide the axle torque command previously determined;
      compare the axle torque command with a brake exit threshold to determine whether the axle torque command is greater than the brake exit threshold;
      in response to determining that the axle torque command is greater than the brake exit threshold, compare a current headway distance between the host vehicle and the lead vehicle with a headway exit threshold to determine whether the current headway distance between the host vehicle and the lead vehicle is greater than the headway exit threshold; and in response to determining that the predetermined headway distance between the host vehicle and the lead vehicle is greater than the headway exit threshold, command the brake of the host vehicle to disengage to terminate braking.

12. The vehicle of claim 11, wherein the controller is programmed to:
determine a maximum axle torque command, wherein the maximum axle torque command is a function of the road grade; and
in response to determining that the axle torque command is not greater than the brake exit threshold, limit the axle torque command to the maximum axle torque command.

13. The vehicle of claim 12, wherein the controller is programmed to:
determine a velocity of the host vehicle;
determine a velocity of the lead vehicle; and
determine a delta velocity, wherein the delta velocity is a difference between the velocity of the lead vehicle and the velocity of the host vehicle.

14. The vehicle of claim 13, wherein the controller is programmed to:
compare the delta velocity with a lead velocity threshold to determine whether the delta velocity is greater than the lead velocity threshold.

15. The vehicle of claim 14, wherein the controller is programmed to:
sets the brake exit threshold to be equal to a difference between an initial break exit threshold and a deceleration offset value in response to determining that the delta velocity is greater than the lead velocity threshold.

16. The vehicle of claim 15, wherein the controller is programmed to:
sets the headway exit threshold to be equal to a difference between an initial headway exit threshold and a headway offset value in response to determining that the delta velocity is greater than the lead velocity threshold.

17. The vehicle of claim 14, wherein the controller is programmed to:
determine that the brake exit threshold is equal to an initial break exit threshold in response to determining that the delta velocity is not greater than the lead velocity threshold.

18. The vehicle of claim 17, wherein the controller is programmed to:
determine that the headway exit threshold is equal to an initial headway exit threshold in response to determining that the delta velocity is not greater than the lead velocity threshold.

19. The vehicle of claim 11, wherein the axle torque command is a function of the predetermined headway distance from the host vehicle to the lead vehicle.

20. The vehicle of claim 11, wherein the vehicle is attached to a trailer, and the axle torque command is determined using a following equation:

$$\text{AxCommand} = K1 * \text{HDerr} + K2 * \Delta \text{HDerr} - mg * \sin(\theta)$$

where:
m = a mass of host vehicle plus the mass of trailer;
K1 is a first calibration factor;
K2 is a second calibration factor;
g is a gravitational constant;
V is the host vehicle speed;
HT is the driver selected headway time;
HD is the predetermined headway distance (V*HT) from the host vehicle to the lead vehicle;
L is the measured distance from the host vehicle to the lead vehicle;
$\text{HD}_{err}$ is the headway error, HD−L;
θ is the angle from the road surface to the virtual horizontal line; and
ΔHDerr is a first derivate of the headway error with respect to time.

* * * * *